Sept. 26, 1967     I. E. DORSCHNER     3,343,848
SUSPENSION MEANS FOR AGRICULTURAL IMPLEMENTS
Filed March 30, 1966     4 Sheets—Sheet 1
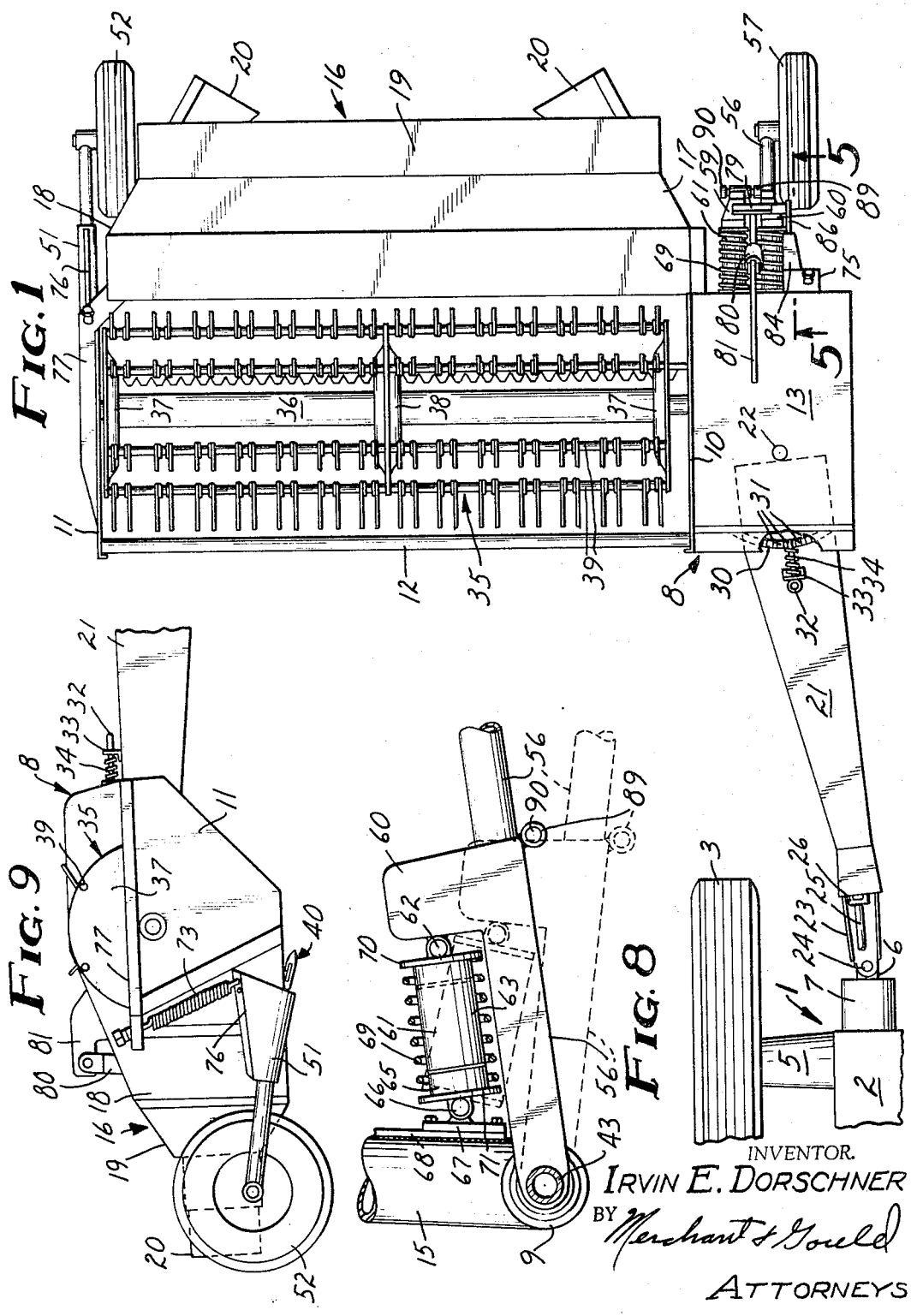
INVENTOR.
IRVIN E. DORSCHNER
BY Merchant & Gould
ATTORNEYS

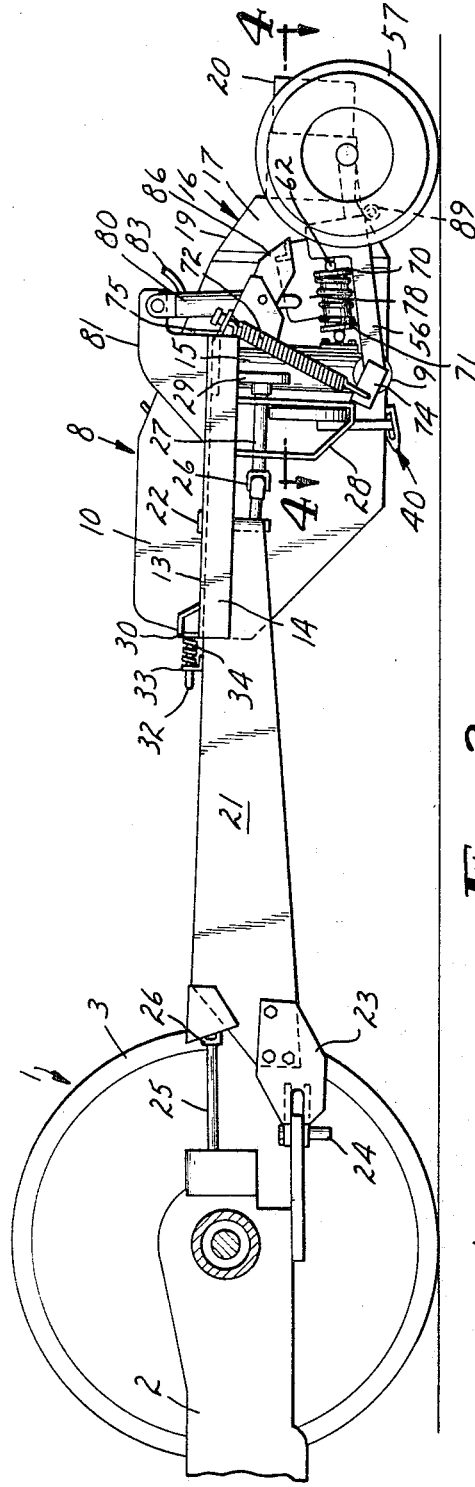
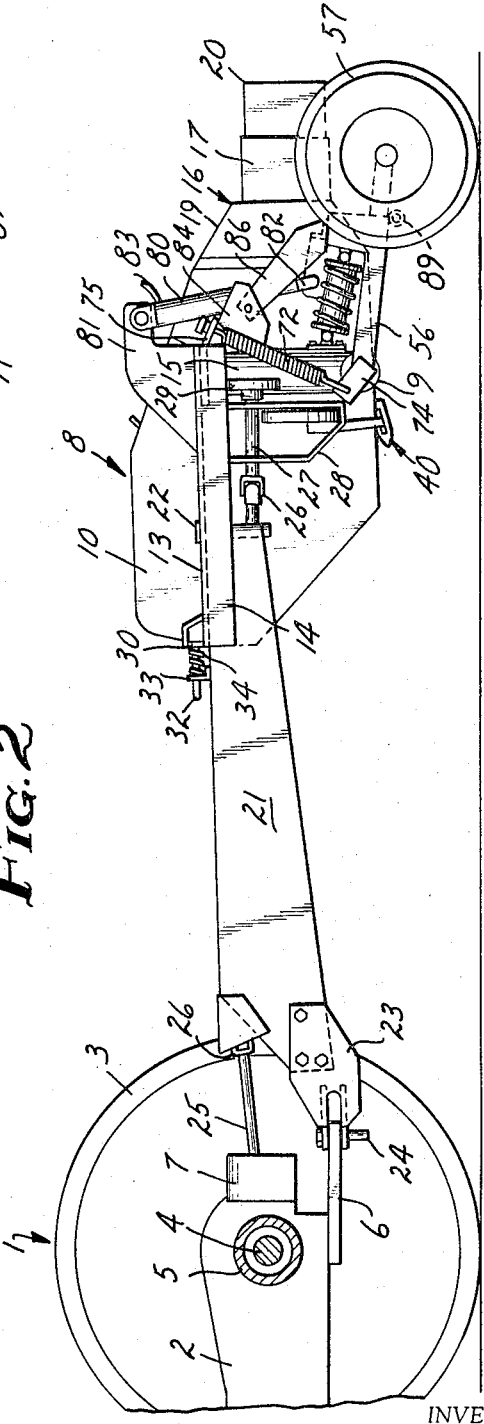

Sept. 26, 1967      I. E. DORSCHNER      3,343,848
SUSPENSION MEANS FOR AGRICULTURAL IMPLEMENTS
Filed March 30, 1966      4 Sheets-Sheet 3
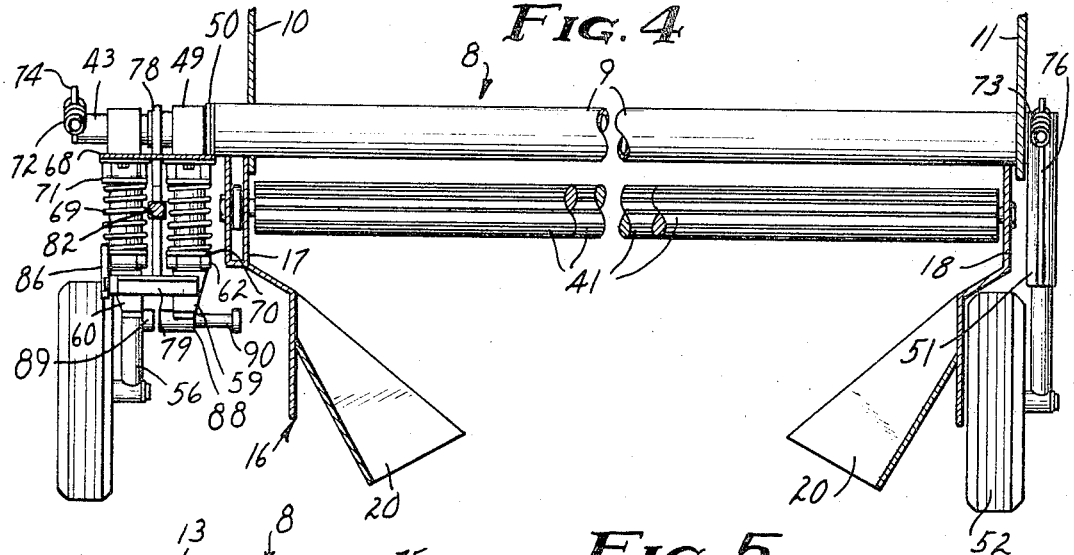
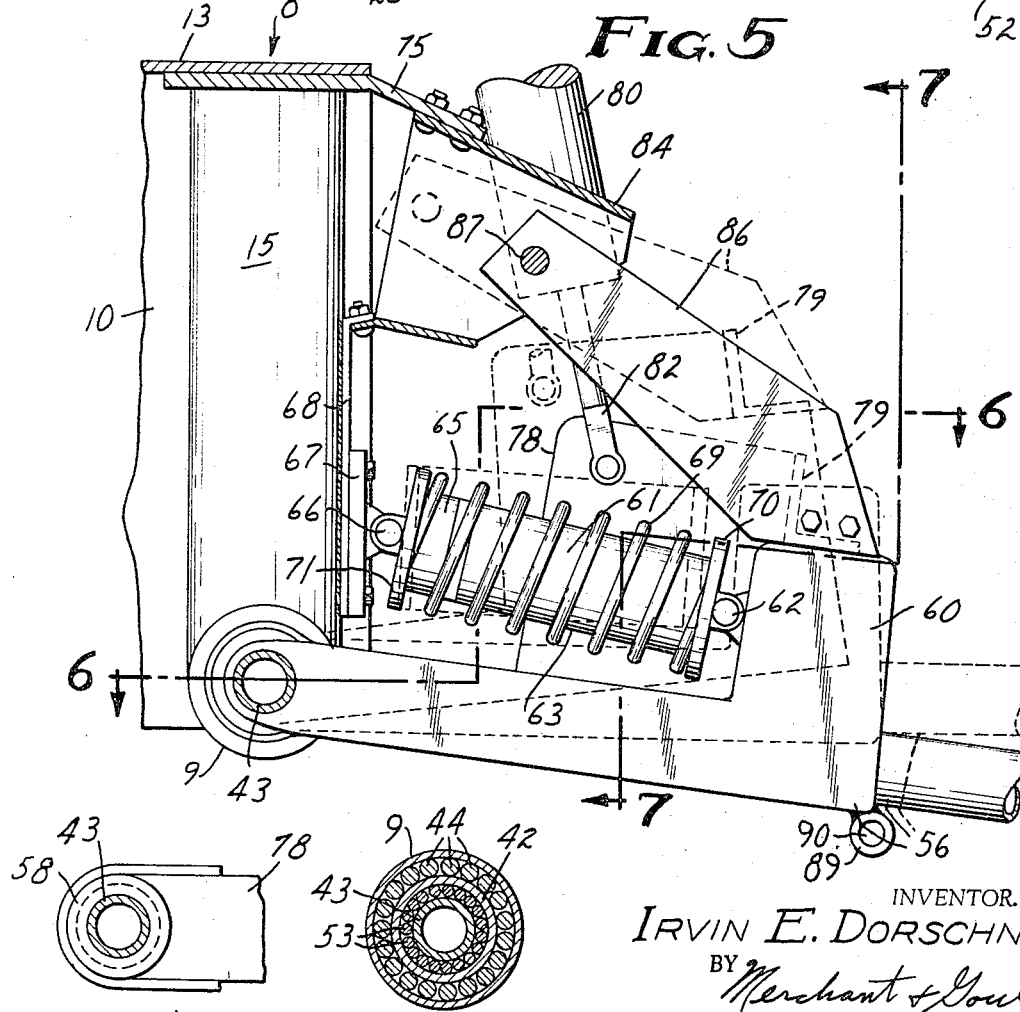
INVENTOR.
IRVIN E. DORSCHNER
BY Merchant & Gould
ATTORNEYS

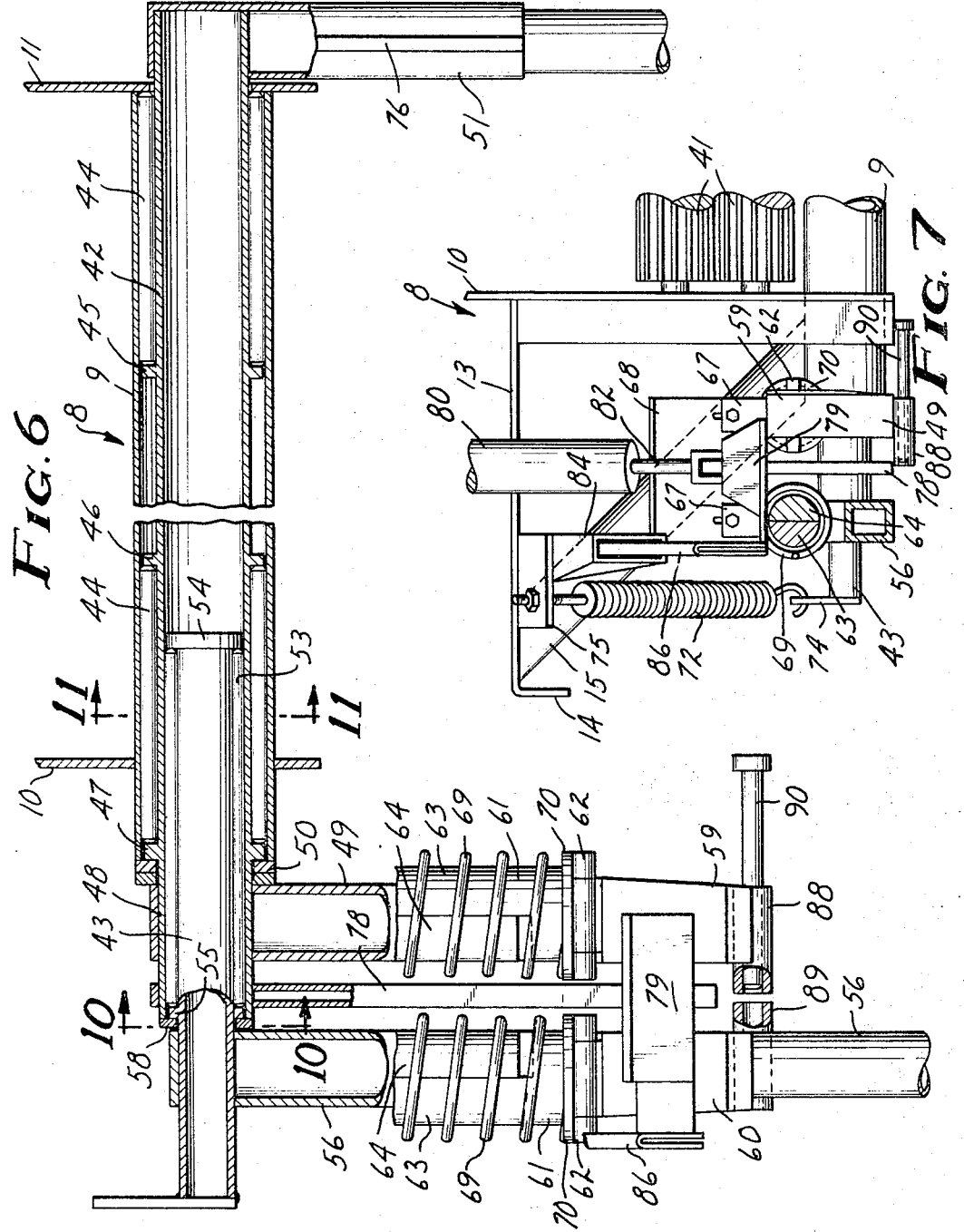

United States Patent Office 3,343,848
Patented Sept. 26, 1967

3,343,848
SUSPENSION MEANS FOR AGRICULTURAL
IMPLEMENTS
Irvin E. Dorschmer, Owatonna, Minn., assignor to Owatonna Manufacturing Company, Inc., Owatonna, Minn.
Filed Mar. 30, 1966, Ser. No. 538,790
10 Claims. (Cl. 280—43.18)

This invention relates generally to improvements in agricultural implements, and more particularly, to an improved suspension for mobile implements.

An important object of this invention is the provision of a mobile implement having a suspension system, including means for selectively raising and lowering the implement relative to the ground, so that the implement may be lowered to a predetermined elevation for operation in a field, or may be elevated for road travel.

Another important object of this invention is the provision of a suspension system having a pair of ground-engaging wheels and means for raising and lowering the implement relative to the wheels, including an arrangement whereby each of the wheels may partake of generally vertical movement independently of the other thereof, so that the implement may travel substantially level and with a high degree of smoothness over rough terrain.

Another object of this invention is the provision of a suspension system as set forth wherein the means for raising and lowering the implement relative to the wheels is disposed principally adjacent one of a pair of laterally widely spaced implement supporting wheels whereby to be out of the way of the operating mechanism of the implement contained between the wheels.

Yet another object of this invention is the provision of means for positively locking the suspension system in its implement raised condition against downward movement of the implement relative to the wheels.

Still another object of this invention is the provision of an implement suspension system as set forth, which is relatively simple and inexpensive to produce, which is highly efficient in operation, and which is rugged in construction and durable in use.

To the above ends, the suspension system of this invention involves a pair of axially aligned generally horizontal axle shafts which extend transversely of the direction of travel of the implement, one of said shafts being journalled in the frame structure of the implement and extending for the greater part of the width of the implement, the other of said axle shafts being relatively shorter than said one thereof. At their outer end portions, each of the shafts has a trailing arm rigidly secured thereto, and ground-engaging supporting wheels journalled to said trailing arms rearwardly of and on axes parallel to the common axis of said shafts. The longer axle shaft, adjacent its inner end, is provided with a radial arm disposed adjacent the trailing arm of the relatively shorter axle shaft. A pair of springs yieldingly urge the radial arm and adjacent trailing arm in a generally downward direction of swinging movement about the axis of the axle shafts, whereby to tend to raise or yieldingly support the implement. Means including a member engageable with said radial arm and adjacent trailing arm is provided to exert downward pressure thereon to raise the implement relative to the wheels, and means for positively locking the implement against downward movement relative to the wheels is also provided.

The above, and still further highly important objects and advantages of this invention will become apparent from the following detailed specification, appended claims and attached drawings.

Referring to the drawings, which illustrate the invention, and in which like reference characters indicate like parts throughout the several views:

FIG. 1 is a view in top plan of an agricultural implement embodying the present invention, some parts being broken away;

FIG. 2 is a view in side elevation of the implement of FIG. 1;

FIG. 3 is a view corresponding to FIG. 2, but showing a different position of some of the parts;

FIG. 4 is an enlarged fragmentary view partly in top plan and partly in section, taken substantially on the line 4—4 of FIG. 2;

FIG. 5 is an enlarged fragmentary view, partly in side elevation and partly in section, taken on the line 5—5 of FIG. 1;

FIG. 6 is a fragmentary section taken substantially on the line 6—6 of FIG. 5;

FIG. 7 is a fragmentary section taken on the irregular line 7—7 of FIG. 5;

FIG. 8 is an enlarged fragmentary detail corresponding to a portion of FIG. 2, some parts being broken away and some parts being shown in section;

FIG. 9 is a fragmentary view in side elevation of the opposite side of the implement of FIG. 1 as that shown in FIGS. 2 and 3;

FIG. 10 is a fragmentary section taken substantially on the line 10—10 of FIG. 6; and FIG. 11 is a transverse section taken on the line 11—11 of FIG. 6.

Referring with greater detail to the drawings, a prime mover, such as a conventional tractor, is fragmentarily shown in FIGS. 1–3 and indicated generally by the reference numeral 1, those parts of the tractor 1 shown including a main body portion 2, a rear wheel 3 suitably mounted on an axle 4 contained in an axle housing 5, a drawbar 6 and a power take-off housing 7.

A mobile agricultural implement is shown in FIGS. 1–3 as being connected to the drawbar 6 of the tractor 1 and is in the nature of a windrower and conditioner for hay or the like. The windrower and condition comprises a frame structure 8 including a generally horizontally disposed elongated tubular frame member 9 that extends transversely of the direction of travel of the implement, a pair of vertically disposed plate-like frame members 10 and 11 that are welded or otherwise rigidly secured to opposite end portions of the tubular frame member 9, a transverse frame member or bar 12 welded or otherwise rigidly secured at its opposite ends to the frame members 10 and 11 at their front end portions, a top plate 13 having an inner edge welded or otherwise rigidly secured to the frame member 10 and projecting laterally outwardly therefrom and terminating at its outer edge portion in a depending flange 14, and an annularly disposed tubular brace member 15 welded or otherwise rigidly secured to the outer or flanged edge portion of the top plate 13 and the adjacent end portion of the tubular frame member 9. The frame structure 8 further includes a conditioner housing 16 having end plates 17 and 18 welded to the tubular frame member 9, a top wall 19 and a pair of rearwardly converging guide portions 20 secured to the end plates 17 and 18 and underlying the top wall 19. The frame structure 8 is adapted to be connected to the drawbar 6 of the tractor 1 by means of an elongated draft or hitch arm 21 that is pivotally secured at its rear end to the top plate 13 by means of a vertically disposed pivot bolt or the like 22, the front end of the draft arm 21 being provided with a bifurcated hitch 23 which straddles the drawbar 6, and which is releasably secured to the drawbar 6 by means of a hitch pin or the like 24. The draft arm 21 is hollow and encompasses an elongated drive shaft 25 that is connected at its front end to the power take-off mechanism, not shown, but contained within the housing 7 of the tractor 1, in the usual manner. The drive shaft 25 is made up of a plurality of sections connected by universal joints 26, the rearmost section 27 of the drive shaft 25 being journalled in a suitable bracket 28 and having secured thereto a pulley or the like 29 for driving the movable portions of the implement, hereinafter to be described. The top plate 13 is provided with an arcuate plate 30 having circumferentially spaced apertures 31 for reception of a locking pin 32 slidably mounted in a bracket 33 on the draft arm 21, the pin 32 being yieldingly urged toward the apertures 31 by a coil compression spring 34. With this arrangement, the draft arm 21 may be pivotally moved about the axis of the pivot bolt 22 and locked in a desired set position relative to the implement, whereby the implement may be adjusted laterally with respect to the path of movement of the tractor 1.

A crop engaging reel 35 comprises a central shaft 36 that is journalled at its opposite ends in the plate-like frame members 10 and 11, end flanges 37 on opposite end portions of the shaft 36, a central flange 38, and a plurality of circumferentially spaced tine-equipped bars 39 extending through the central flange 38 and having their opposite ends mounted on the end flanges 37. A conventional sickle bar mower 40 is mounted on and projects forwardly of the tubular frame member 9 in underlying parallel relationship to the reel 35. A pair of crop or hay conditioner rolls 41 are disposed rearwardly of the reel 35 and mower 40, and are journalled at their opposite ends in the end plates 17 and 18 on horizontal axes parallel to the axis of the reel 35. The reel 35, mower 40 and conditioner rolls 41 are driven from the drive pulley 29 by suitable and well-known power transmission mechanism, not shown. As the implement is pulled through a field, the reel 35 moves the standing crop into the mower 40 and toward the conditioner rollers 41, the cut crop being fed between the rollers 41 where it is properly crimped and discharged rearwardly in a windrow, the cut crop being guided downwardly and laterally by the top wall 19 and guide portions 20 respectively. The reel 35, mower 40, and conditioner rolls 41, being of well-known and commercially available construction, do not, in and of themselves, comprise the instant invention. Hence, further detailed showing and description thereof is believed not necessary and is omitted in the interest of brevity.

The suspension means of this invention comprises a pair of coaxial axle shafts 42 and 43, both of which are preferably made from commercially available rigid tubing of steel or the like. The shaft 42 extends axially through the tubular frame member 9 and outwardly of the opposite ends thereof, and is concentrically journalled in the tubular frame member 9 by elongated roller bearings 44 at opposite end portions of the tubular frame member 9, see particularly FIGS. 6 and 11. As shown in FIG. 6, one set of the roller bearings 44 is disposed between the plate-like frame member 11 and an annular flange 45 on the axle shaft 42, the other set of roller bearings 44 being disposed between a pair of other circumferential flanges 46 and 47 on the axle shaft 42. The shaft 42 extends axially outwardly of the tubular frame member 9 from the flange 47 to provide an end portion 48 on which is welded or otherwise rigidly secured one end of a radial arm 49. A retaining ring 50 loosely encompasses the end portion 48 intermediate the inner end of the radial arm 49 and the flange 47, and is welded to the adjacent end of the tubular frame member 9 to prevent axial movement of the axle shaft 42 in one directiton. The roller bearings 44 between the flange 45 and plate-like frame member 11 prevent axial movement of the axle shaft 42 in the opposite direction. The radial trailing arm 51 has its inner end welded or otherwise rigidly secured to the end portion of the axle shaft 42 which projects laterally outwardly of the frame member 11, and projects generally rearwardly therefrom, the outer or rear end of the trailing arm 51 having journalled thereon a pneumatic tire equipped supporting wheel 52 for rotation on an axis parallel to the axis of the axle shafts 42 and 43.

The axle shaft 43 is concentrically journalled within the axle shaft 42 by a plurality of elongated roller bearings 53 contained between a pair of axially spaced flanges 54 and 55 rigidly mounted on the axle shaft 43, see FIG. 6. The axle shaft 43 projects axially outwardly from the end portion 48 of the axle shaft 42, and has welded or otherwise rigidly mounted thereon the inner end of a trailing arm 56 that extends generally rearwardly in the same manner as the trailing arm 51. At its outer or rear end, the trailing arm 56 has journalled thereon a pneumatic tire equipped ground-engaging wheel 57 for rotation on a horizontal axis parallel to the common axis of the axle shafts 42 and 43. The trailing arm 56 is disposed in closely spaced generally parallel relationship to the radial arm 49, and together with the axle shaft 43 is held against axial movement relative to the shaft 42 by a retainer ring 58 disposed between the radially inner end of the trailing arm 56 and the adjacent end of the axle shaft end portion 48 and welded to the end of the axle shaft portion 48.

At its radially outer end, the radial arm 49 is formed to provide an upstanding abutment member or lug 59. A similar upstanding abutment element or lug 60 is welded or otherwise rigidly secured to the intermediate portion of the trailing arm 56 in closely laterally spaced relation to the lug 59. A pair of guide members 61 are pivotally secured one each to a different one of the lugs 59 and 60, as indicated at 62, the guide members 61 having semi-cylindrical portions 63 which slidably engage cooperating semi-cylindrical portions 64 of cooperating guide members 65 that are pivotally connected, as indicated at 66, to an abutment plate or the like 67 that is bolted or otherwise rigidly secured to a mounting plate 68 welded or otherwise rigidly anchored to the brace member 15, see particularly FIGS. 5 and 7. A pair of coil compression springs 69 each encompass a different cooperating pair of the guide members 61 and 65, each of the springs 69 having opposite ends which abut flanges 70 and 71 on the guide members 61 and 65 respectively adjacent their respective pivot connections 62 and 66. The springs 69 yieldingly urge the radial arm 49 and trailing arms 51 and 56 in a downward direction of swinging movement relative to the frame structure 8, thus exerting a lifting force against the frame structure 8 and parts carried thereby, the bias exerted by the spring 69 associated with the radial arm 49 being transferred to the trailing arm 51 through the tubular axle shaft 42. A pair of auxiliary counterbalancing springs 72 and 73 are used to supplement the yielding bias of the springs 69, the springs 72 and 73 being of the coil tension variety. The spring 72 is connected at one end to a radial bar or lug 74 welded to and extending generally forwardly of the outer end of the axle shaft 43, and at its upper ends adjustably secured to an anchoring bracket 75 that is welded to the top plate 13. The spring 73 is connected at its lower end to a forwardly and upwardly projecting portion 76 of the trailing arm 51, and is adjustably secured at its upper end to a flange 77 projecting laterally outwardly from the adjacent plate-like frame member 11, see particularly FIG. 9. With this arrangement, yielding bias is applied to the trailing arm 51 by one of the springs 69 and the spring 73 and to the trailing arm 56 by the other one of the springs 69 and the spring 72, so that the trailing arms 51 and 56 are independently biased. Thus, when the frame structure 8 and parts carried thereby are drawn over a field, each of the wheels 52 and 57 follows the terrain independently of the other thereof, and the implement rides smoothly and the mower 40 cuts the crop to be windrowed at substantially uniform level above the ground surface. The normal operating position of the implement is shown in FIG. 2.

Means for raising the frame structure 8 and parts carried thereby from its operating position of FIG. 2, to an elevated transport position, shown in FIG. 3, comprises a leg 78 that is journalled at one end of the end portion 48 of the axle shaft 42 between the radial arm 49 and the retaining ring 58, see particularly FIG. 6. The leg 78 extends generally rearwardly from the axle shaft portion 48 between the radial arm 49 and the trailing arm 56 and terminates at its rear end in a generally horizontally disposed laterally projecting foot 79 which overlies the upper ends of the lugs 59 and 60. A fluid pressure operated cylinder 80 has its upper end pivotally secured to a bracket 81 that is welded to the top plate 13, the cylinder 80 being provided with a cooperating piston, not shown, but which is connected to a piston rod 82 that extends axially outwardly of the lower end of the cylinder 80 and which is pivotally connected to the radial leg 78. A conduit 83 communicates with the upper end portion of the cylinder 80 and is adapted to be connected to a source of fluid under pressure, not shown, whereby fluid may be introduced to the upper end of the cylinder 80 to impart downward movement to the piston rod 82 relative to the cylinder 80 to move the foot 79 into engagement with the upper ends of the lugs 59 and 60. As introduction of fluid to the upper end of the cylinder 80 is continued, axially outward movement of the piston rod 82 causes the cylinder 80, bracket 81 and frame structure 8 to be elevated relative to the wheels 52 and 57, as shown in FIG. 3. With the frame structure 8 and parts carried thereby thus elevated, the implement may be readily moved from one field to another without risk of damage to the mower structure 40, which otherwise might be caused by obstructions in the path thereof, such as stones or the like. It will be appreciated that the conduit 83 may extend to the tractor 1 which may be assumed to carry a suitable pump and controls for the fluid pressure system. It will be further noted that movement of the piston rod 82 in an implement raising direction applies pressure of the foot 79 against the lugs 59 and 60 in the same direction as that applied by the springs 69, 72 and 73; and, when the piston rod 82 is retracted into the cylinder 80 to its limit of retracting movement, the foot 79 is disposed in upwardly spaced relation to the lugs 59 and 60, whereby to permit individual swinging movement of the radial arm 49 and trailing arms 51 and 56 about the common axis of the axle shafts 42 and 43. Means for independently holding the frame structure 8 in its elevated position illustrated in FIG. 3, independently of the fluid pressure cylinder 80 and piston rod 82, comprises a pair of cooperating locking members, one of which is in the nature of a hollow bracket 84 that is bolted to the mounting plate 68 and to anchoring bracket 75 welded to the top plate 13. The other of said cooperating members is in the nature of an elongated plate-like finger or bar 86 that is bolted or otherwise rigidly secured to the foot 79 and which extends into the hollow bracket 84. The bar 86 and side walls of the hollow bracket 84 are provided with suitable apertures which, when the frame structure is raised by the fluid pressure cylinder 80 to its elevated position of FIG. 3, are axially aligned to receive a locking pin 87, see particularly FIG. 5. With the load thus carried by the locking pin 87, pressure may be relieved in the cylinder 80, whereby to ease the load of the fluid pressure system during transit of the implement from one location of operation to another.

The lower ends of the lugs 59 and 60 are each provided with a pair of transverse hollow like bearings 88 and 89 respectively, that are adapted to slidably receive a locking bolt or pin 90. Preferably, the pin 90 is retained in the bearing 88 at all times, and is axially movable into and out of the bearing 89. When it is desired that the trailing arms 51 and 56 operate independently of each other, as above described, the bolt or pin 90 is moved axially out of the bearing 89. However, when it is desired to lock the trailing arms 51 and 56 together for common swinging movements about the common axis of the shafts 42 and 43, the locking bolt or pin 90 is axially moved into the bearing 89. Thus, the radial arm 49 with its trailing arm 51 is rigidly locked to the trailing arm 56. This condition adds to the stability of the implement when the same is moved over a field having smooth even terrain, or over a smooth highway during transport period.

It will be appreciated that the substantially greater length of the draft arm 21 relative to the trailing arms 51 and 56 causes the greater portion of the weight of the frame structure 8 and parts carried thereby to be imposed upon the wheels 52 and 57 through the springs 69, 72 and 73; and that a much smaller proportion of the weight of the frame structure 8 is imposed upon the drawbar 6 of the prime mover or tractor 1.

This invention has been thoroughly tested and found to be completely satisfactory for the accomplishment of the objectives set forth; and while a commercial embodiment of suspension system has been shown and described, it will be understood that the same is capable of modification without departure from the spirit and scope of the invention, as defined in the claims.

What is claimed is:
1. In an agricultural implement including a frame structure and suspension means for said frame structure, said suspension means comprising:
   (a) a pair of axially aligned axle shafts journalled in said frame structure on a common generally horizontal axis extending transversely of the path of travel of the frame structure,
   (b) a plurality of radial members secured to said axle shafts and including a pair of trailing arms each disposed at an opposite side of said frame structure and each having one end rigidly secured to and extending generally rearwardly of a different one of said axle shafts for swinging movements about said common axis,
   (c) supporting wheels journalled on said trailing arms rearwardly of said axle shafts and on axes parallel to said common axis,
   (d) yielding means operatively connected to said frame structure and radial members and urging each of said trailing arms in a generally downward direction of said swinging movement independently of the other of said trailing arms,
   (e) a movable member mounted on said frame structure and movable in one direction to engage one each of said radial members associated with a different one of said axle shafts to impart movement to said trailing arms simultaneously in a downward direction of swinging movement thereof relative to said frame structure and independently of said yielding means, whereby to raise said frame structure relative to said wheels, and movable in the opposite direction to be disengaged from said radial members, whereby the weight of said frame structure is exerted on said yielding means,
   (f) and means for imparting movements to said movable member in both directions of said movement thereof.

2. The suspension means defined in claim 1 characterized by locking means for releasably locking said movable member relative to said frame structure in at least one position of movement of said movable member.

3. The suspension means defined in claim 2 in which said locking means comprises a pair of cooperating locking members, one of which is secured to said frame structure and the other of which is secured to said movable member for common movements therewith, said locking members having openings therethrough which move into axial alignment responsive to predetermined movement of said movable member in said one direction, and a locking pin for insertion through said openings to rigidly hold said frame structure in a raised position relative to said wheels independently of said means for imparting movements to said movable member.

4. The suspension means defined in claim 1 in which one of said axle shafts defines an axial recess, the other of said shafts being journalled in said recess, said radial members including a radial arm extending radially from said one of the shafts adjacent the trailing arms of said other one of the shafts, said movable member having a portion overlying said radial arm and the adjacent trailing arm for engagement with said radial arm and adjacent trailing arm.

5. The suspension means defined in claim 4 in which said yielding means comprises a pair of coil compression springs, each of said springs being interposed between said frame structure and a different one of said radial arm and trailing arm adjacent said radial arm.

6. The suspension means defined in claim 1 in which said frame structure includes an elongated generally horizontal tubular frame member, extending transversely of the direction of travel of the implement, one of said axle shafts being concentrically journalled in said tubular member and having opposite end portions extending axially outwardly from opposite ends of said tubular member, said one of the axle shafts being tubular and concentrically journalling the other of said axle shafts in one of said opposite end portions.

7. The suspension means defined in claim 6, in which said radial members include a radial arm secured to and extending radially from said one of the axle shafts adjacent the trailing arm of said other one of the axle shafts, said movable member having a portion overlying said radial arm and the adjacent trailing arm for engagement with said radial arm and adjacent trailing arm.

8. The suspension means defined in claim 7 in which said movable member comprises a leg having an inner end journalled on one of said axle shafts and extending radially therefrom between said radial arm and the adjacent one of said trailing arms, said movable member portion comprising a presser foot on the radially outer end portion of said leg and projecting laterally outwardly therefrom.

9. The suspension means defined in claim 8 characterized by a pair of cooperating locking members one of which is secured to said frame structure and the other of which is operatively secured to the outer end portion of said leg for common movements therewith, said locking members having openings therethrough which move into axial alignment responsive to predetermined movement of said leg in one direction, and a locking pin for insertion through said openings to rigidly hold said frame structure in a raised position relative to said wheels independently of said means for imparting movements to said leg.

10. The structure defined in claim 1 characterized by attachment means for attaching said frame structure to a prime mover, said attachment means comprising a draft arm rigid with said frame for generally vertical movements therewith, whereby a minor portion of the weight of said implement is borne by the draft arm, the major portion of the weight of the implement being borne by said wheels.

References Cited
UNITED STATES PATENTS

| | | | |
|---|---|---|---|
| 2,494,144 | 1/1950 | Restall | 280—43.18 X |
| 2,719,726 | 10/1955 | Johnston | 280—43.18 |
| 2,835,400 | 5/1958 | Latzke | 280—43.18 |
| 2,864,626 | 12/1958 | Schantz | 280—43.18 |
| 3,175,344 | 3/1965 | Fischer | 280—43.23 X |

BENJAMIN HERSH, *Primary Examiner.*

CHARLES C. PARSONS, *Assistant Examiner.*